INVENTOR
HELLMUT I. GLASER
BY
ATTORNEYS

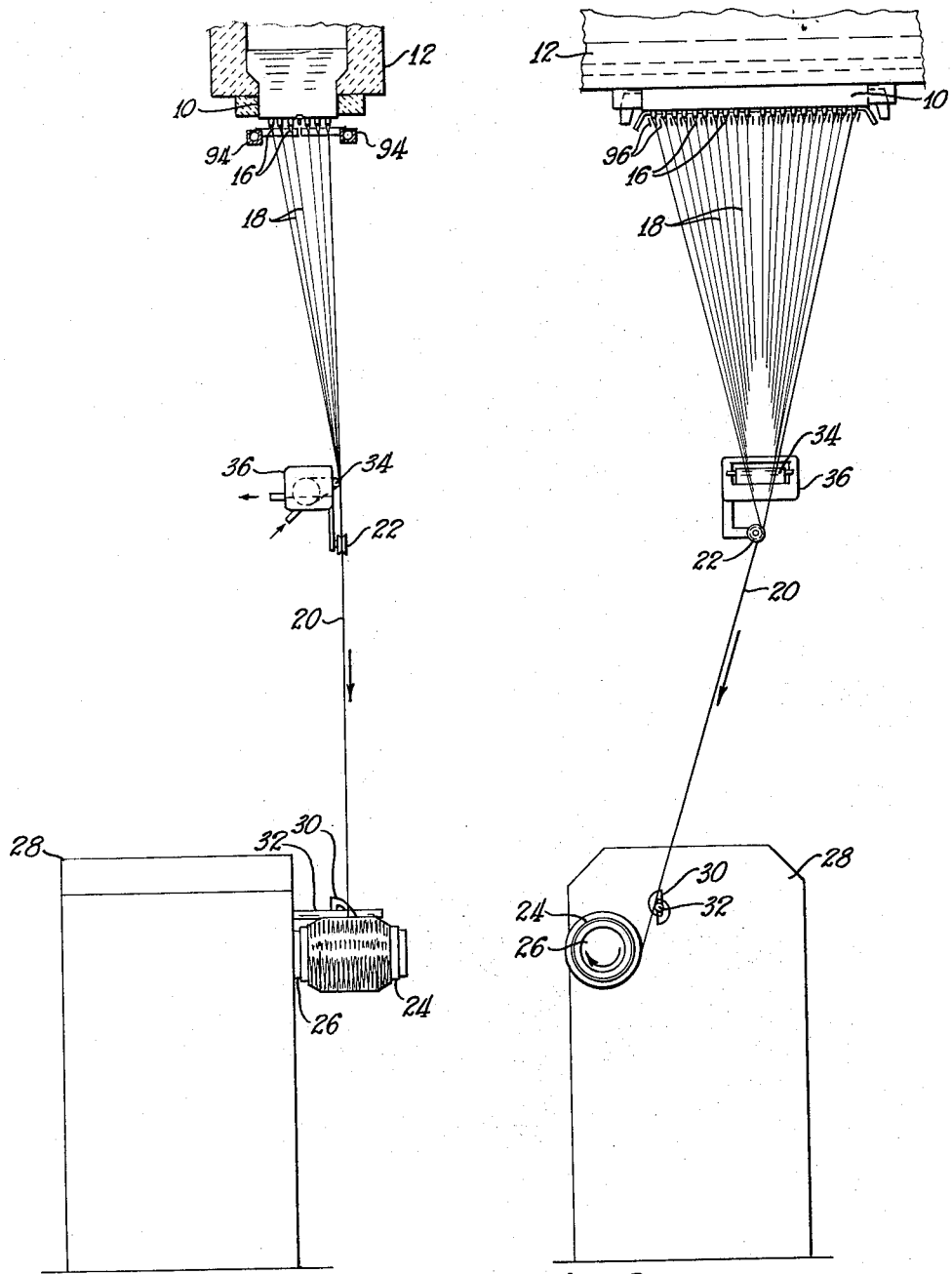

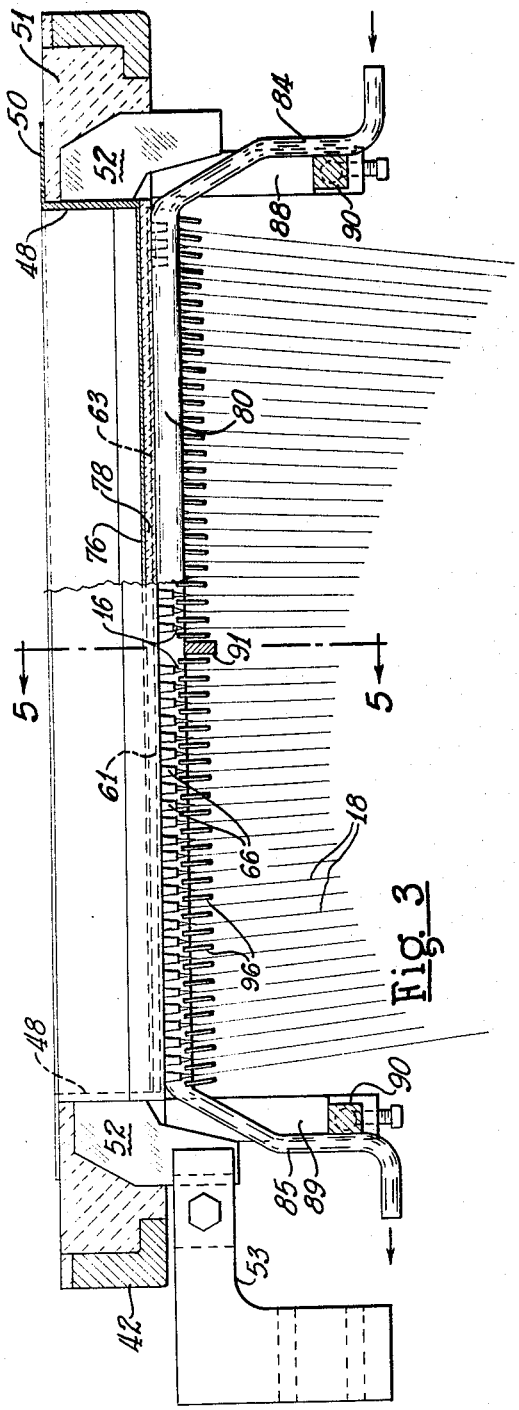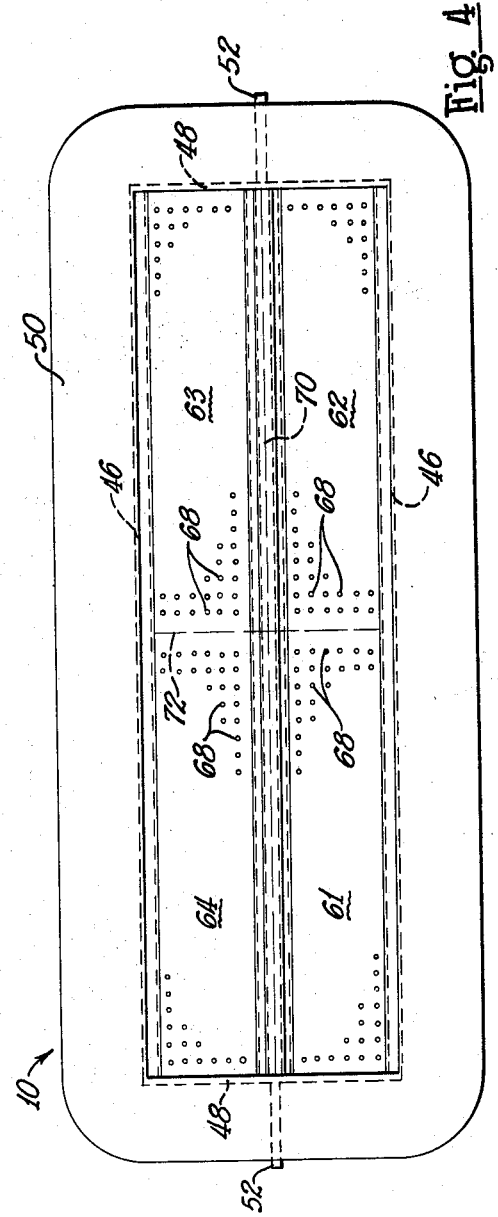

Aug. 8, 1967   H. I. GLASER   3,334,981
APPARATUS FOR PROCESSING HEAT-SOFTENABLE
MINERAL MATERIAL
Filed March 13, 1964   5 Sheets-Sheet 4
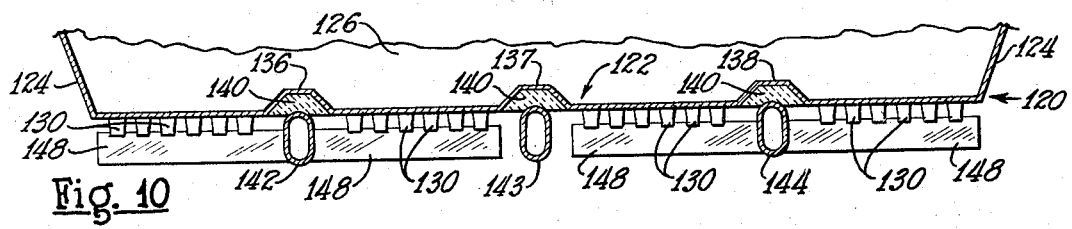
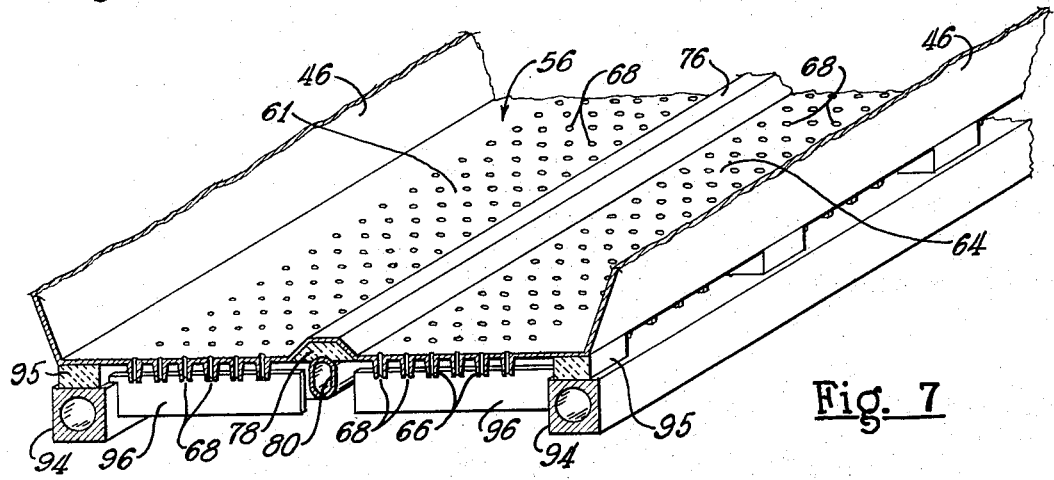
INVENTOR
HELLMUT I. GLASER
BY
ATTORNEYS Aug. 8, 1967 H. I. GLASER 3,334,981
APPARATUS FOR PROCESSING HEAT-SOFTENABLE
MINERAL MATERIAL
Filed March 13, 1964 5 Sheets-Sheet 5

INVENTOR
HELLMUT I. GLASER
BY
*Staelin & Overman*
ATTORNEYS

United States Patent Office 3,334,981
Patented Aug. 8, 1967

3,334,981
APPARATUS FOR PROCESSING HEAT-
SOFTENABLE MINERAL MATERIAL
Hellmut I. Glaser, Anderson, S.C., assignor to Owens-
Corning Fiberglas Corporation, a corporation of Delaware
Filed Mar. 13, 1964, Ser. No. 351,761
11 Claims. (Cl. 65—12)

This invention relates to a method of and apparatus for processing heat-softenable mineral material, such as glass, and more especially to a method and apparatus for feeding a large number of streams of glass adapted to be attenuated to very fine continuous filaments.

Continuous filaments of glass have been made extensively commercially and formed into strands and yarns particularly usable in the production of fabrics. Continuous filaments of glass have the advantages of high strength characteristics chemical and physical stability. Recent developments have been made wherein exceedingly fine filaments of glass of diameters approximately fourteen hundred thousandths of an inch or less in diameter have been utilized in strands and yarns for fabrics providing much greater flexibility, a characteristic particularly desirable in fine fabrics which have an improved hand and feel and withstand folding and usage without failure.

A prime objective in the development of facilities for the commercial production of exceedingly fine filaments resides in the incorporation or embodiment of a much greater number of fine filaments in each strand. As each filament is formed or attenuated from a fine stream of glass, the large number of fine filaments in a strand are formed simultaneously, necessitating flowing the same number of streams of glass from a stream feeder or bushing. Prior to the development of exceedingly fine filaments, strands produced commercially contained about two hundred filaments requiring a comparatively small stream feeder, but with the advent of commercial production of finer filaments, a much greater number of such filaments is embodied in a single strand and a stream feeder of increased size is essential to provide the requisite number of streams of glass.

When constructing a feeder or bushing for flowing a plurality of streams of glass, the usual procedure is to build up tips or projections on a feeder floor or section of platinum and rhodium alloy by fusing or welding successive drops of the alloy to form a projection which is coined to shape and drilled to provide an orifice for a glass stream. This method of forming orificed tips or projections necessitates localized heating of the tip section or feeder floor at the region of each projection setting up internal stresses tending to produce warpage of the tip section.

In the production of tip sections with comparatively small number of projections the warpage does not usually impair the operation of the feeder, but with the advent of feeding means for flowing several hundred streams of glass, a tip section of substantially greater area is required and the tendency toward warpage and sagging of the tip section or area of the stream feeder under the intense heat of the softened or molten glass adversely affects the production of filaments of uniform size and characteristics.

The present invention embraces a method of forming a floor or tip section of large area of a stream feeder to minimize warping of the stream feeder area.

Another object of the invention embraces a method of supporting the stream feeder area or tip section to eliminate sag of the section under intense heat to facilitate the maintenance of uniform temperature and viscosity characteristics of the softened glass adjacent the tip section or area.

Another object of the invention resides in the fabrication of a multisection stream feeder area wherein the several sections or subsections are prefabricated with orificed projections or tips and the subsections joined by welding whereby an improved stream feeder area is provided with a minimum of liability of warpage of the composite structure forming the stream feeder area.

Another object of the invention resides in a method of supporting a stream feeder area or composite tip section fashioned of individually prefabricated sections by a supporting medium which is resistant to changes or variations under high temperature and of a character adapted to dissipate or convey away heat at a rate sufficient to maintain thermal stabilization in the regions of the heat-softened material adjacent the orificed tips.

Another object resides in the provision of a support means for a stream feeder floor provided with groups of orificed projections or tips wherein the support means is disposed between adjacent groups and is arranged to withdraw heat from the feeder floor area adjacent thereto at a rate to promote thermal stability of the heat-softened glass throughout the area of the floor of the feeder.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semi-schematic side elevational view of an arrangement for processing glass or other heat-softened material into attenuated fine continuous filaments;

FIGURE 2 is a front elevational view of the apparatus illustrated in FIGURE 1;

FIGURE 3 is an elevational view of a stream feeder and support means of the invention, certain portions being shown in section for purposes of illustration;

FIGURE 4 is a top plan view of the stream feeder construction illustrated in FIGURE 3;

FIGURE 7 is a fragmentary isometric view of the feeder construction shown in FIGURES 3 through 6 illustrating an arrangement of cooling fins disposed beneath the stream feeder;

FIGURE 10 is a transverse sectional view illustrating a multisection stream feeder with a plurality of support means.

Figure 5:
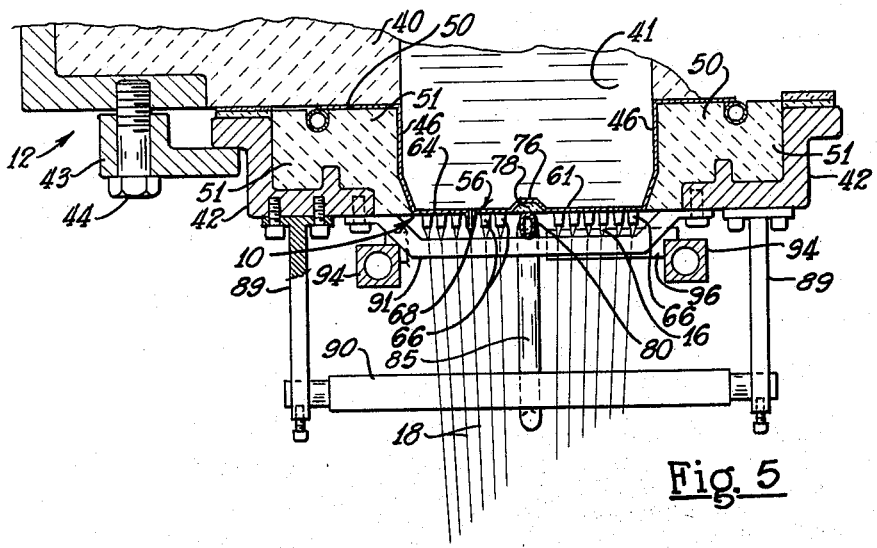
FIGURE 5 is a transverse sectional view taken substantially on the line 5—5 of FIGURE 3.

While the method and apparatus of the invention have particular utility in heat-conditioning and processing heat-softened glass for attenuation into fine textile filaments, it is to be understood that the method and apparatus of the invention may be utilized for heat-conditioning and processing other mineral materials.

Referring to the drawings in detail and initially to FIGURES 1 and 2, a form of stream feeder and support means of the invention are illustrated in combination with apparatus for attenuating streams of glass delivered from the feeder into fine continuous filaments and collecting a strand or group of the filaments in a package. The apparatus is inclusive of a stream feeder or bushing 10 which is arranged to be supplied with and contain heat-softened mineral material, such as glass, and more especially a heat-softened glass suitable for attenuation to fine continuous filaments especially for textile uses.

As shown in FIGURES 1 and 2, the feeder or bushing 10 is connected with a forehearth 12 adapted to receive refined heat-softened glass from a melting furnace (not shown). The feeder 10 may be associated with a glass melting arrangement wherein prerefined glass in the form of spheres or pieces is melted in a region above the feeder at a rate at which the glass is withdrawn or discharged from the feeder in a plurality of streams.

While the feeder construction of the invention is hereinafter described in detail, the feeder floor or bottom area is provided with a comparatively large number of orificed tips or projections through which flow streams 16 of the heat-softened glass and the streams attenuated into fine continuous filaments 18. As shown in FIGURES 1 and 2, the continuous filaments 18 are attenuated by mechanical means. In the form shown, the fine filaments 18 are converged into a multifilament strand 20 through the medium of a gathering device or shoe 22, and the strand 20 wound upon a collector or collecting surface such as a thin-walled tube or sleeve 24.

The collector or tube 24 is mounted upon a mandrel or collet 26 driven by suitable motive means (not shown) contained in a winding machine housing 28 of conventional construction. During the winding of the strand 20 upon the sleeve or collector 24, the strand is traversed lengthwise of the collector to build up a strand package of superposed strand layers. A rotatable strand traverse means 30, supported upon a shaft 32 driven by suitable means (not shown), is engaged with the strand 20 to oscillate the strand in order to effect a crossing of successive convolutions of strand on the collector to prevent adjacent convolutions from adhering together.

A lubricant, size or other coating material may be applied to the filaments in advance of their engagement with the gathering shoe 22 by engaging the filaments with an applicator 34 which receives lubricant, size or coating material from a container or receptacle 36, the applicator construction being of conventional character.

One form of stream feeder bushing construction 10 and support means is illustrated in FIGURES 3 through 7. As shown in FIGURE 5, the forehearth 12 is lined with refractory material 40 providing a glass flow channel 41. Disposed beneath the forehearth 12 is a supporting frame 42 secured in position by lugs 43 and bolts 44. The stream feeder or bushing 10 is formed with side walls 46 and end walls 48, the end and side walls having laterally extending flange means 50 disposed in contiguous relation with a lower surface of the refractory 40 of the forehearth as shown in FIGURE 5.

Refractory material 51 is disposed between the frame 42 and the flange means 50 to maintain the stream feeder in proper position beneath the forehearth, the glass flow channel 41 of the forehearth being in registration with the stream feeder. The stream feeder is electrically heated to maintain the glass at a proper viscosity. Integrated with the end walls at the central regions thereof are terminals 52 to which are secured connectors or clamps 53, one of which is shown in FIGURE 3. Electric energy preferably of low voltage and high amperage is supplied to the feeder bushing by conductors (not shown) connected with the terminal clamps 53.

The floor or floor area 56 of the stream feeder or bushing is fashioned to flow a comparatively large number of streams of glass or other heat-softened filament-forming material to provide a large number of extremely fine filaments in the strand 20. The floor 56 of the stream feeder, also referred to herein as a tip section, is fashioned of four rectangularly-shaped subsections or plates 61, 62, 63 and 64 in which each subsection or plate is provided with a comparatively large number of depending projections or tips 66, each projection or tip being formed with an orifice 68, shown in FIGURES 4 through 7.

By reason of the large number of projections, the floor or floor area 56 is fashioned of a plurality of subsections or plates to facilitate manufacture or fabrication of the feeder floor or tip section and render it more efficient in use. It has been a practice to form a single tip section of a stream feeder of comparatively small size by utilizing a flat plate of an alloy of platinum and rhodium and by indenting the plate at the regions at which the tips are to be formed providing raised portions or dimples. Each raised portion is then built up, by manually flame fusing drops of platinum and rhodium alloy to the raised portions to form the tips or projections.

Each projection or tip is drilled to provide an opening or orifice through which the heat-softened glass is discharged as a minute stream. The high temperature fusing operations occurring at local areas in succession in forming the tips or projections set up strains and stresses in a plate of substantial area which render the plate unstable and liable to warpage when it is subjected to continuous intense heat of molten glass. In the fabrication of a stream feeder of small size having a comparatively small number of tips or projections, warpage caused by such stresses is within acceptable operating tolerance because of the small span or area of the feeder tip section.

In the arrangement of this invention, the difficulties of warpage in a comparatively large feeder having substantial floor area are minimized by fabricating the floor area or tip section of the bushing of a plurality of individually preformed subsections or plates 61, 62, 63 and 64. The preformed individual subsections are assembled and fused or welded together at their contiguous regions, the welding regions being indicated lengthwise of the feeder at 70 and transversely 72 in FIGURE 4.

In order to accommodate several hundred orificed tips or projections in the total tip section, the total floor area is substantial. Under the intense heat of the molten glans or other mineral material, the central region tends to sag, a condition which promotes unstable laminar flow of the glass in the region adjacent the feeder floor.

A support means is provided, arranged lengthwise of the stream feeder, to minimize or reduce distortion or sagging of the tip section. One of the essential characteristics for producing fine filaments of substantially uniform size resides in flowing streams of the same size of heat-softened glass of uniform viscosity adjacent all of the orifices.

Hence the temperature and viscosity of the heat-softened glass adjacent all of the orifices must be maintained uniform. A support means engaging a lengthwise central region of the floor of the stream feeder, without provision for dissipating heat at said region, would normally effect a rise in temperature of the glass at the region of the floor adjacent the support means and thereby set up differential temperatures and viscosities of the glass adjacent certain of the orifices in the proximity of the support means.

A novel method and arrangement of the invention provides adequate structural support throughout the length of the stream feeder, the arrangement functioning as a heat sink or heat transferring medium to convey away or dissipate excess heat at a controlled rate from the region of the feeder adjacent the support means so as to maintain stability of temperature and viscosity of the glass throughout the entire tip section. It is imperative during operation of the stream feeder that the region beneath the feeder by free of obstruction which would impair visual inspection by an operator of all of the streams to facilitate detection of stream flow interruptions or broken filaments.

When stream flow interruption or broken filaments occur, it is then necessary for an operator to interrupt attenuation operations and restart the winding and attenuation of the filaments to secure streams flowing from all of the tips to assure the proper number of filaments in the strand. Continuity of operation is essential in the commercial production of fine filaments for textile uses as frequent interruptions and "down time" makes the cost prohibitive.

The support means and heat sink arrangement should be fashioned to provide a minimum vertical dimension commensurate with the requisite strength characteristics. It is desirable that a metal support and heat sink be employed in order to secure the necessary strength characteristics to resist sagging of the tip section and that the metal support be maintained out of direct contact with the metal of the tip section by a suitable refractory thermal spacing means which is a nonconductor of electric energy so as not to modify flow of electric energy through the stream feeder.

In the form of construction shown in FIGURES 3 through 7, the longitudinal central region of the metal forming the tip section is configurated with a raised portion 76 providing a longitudinal recess in which is disposed a high temperature resistant refractory material 78, preferably cast or molded in the recess.

Disposed beneath and substantially parallel with the refractory material 78 is a feeder support means, preferably a tubular support 80 which is of generally oval cross sectional configuration with the greater dimension disposed in a vertical direction, that is, with the opposing vertical walls 82 of the support tube 80 in substantially vertical parallel relation to obtain structural strength in a vertical direction to resist sagging of the tip section.

The support member or tube 80 is disposed substantially throughout the full length of the stream feeder, as shown in FIGURE 3, and in contact with the refractory member or spacer 78 throughout its length. The longitudinally extending support means or member 80 is preferably of hollow or tubular shape to accommodate a heat transfer medium such as circulating heat absorbing fluid, for example water, in order to transfer or convey away excess heat developed adjacent the raised portion 76 in order to prevent excessive rise in temperature in the molten glass at the lengthwise central region of the stream feeder where there are no orificed tips.

The respective end regions 84 and 85 of the tubular support 80 extend downwardly as shown in FIGURE 3, one end region being connected with a supply of fluid for circulation through the support tube 80, and the other connected with a tube (not shown) for conveying the fluid to cooling means or to a sump. Depending from each end region of the frame structure 42 are pairs of brackets 88 and 89, each pair of brackets supporting a transversely extending member or bar 90.

The end regions 84 and 85 are secured respectively to the transversely extending bars 90 whereby the rectilinear tubular member 80 is maintained in supporting relation with the refractory spacer 78. The amount or rate of heat transferred or conducted away from the central longitudinal region of the stream feeder may be controlled by regulating the temperature of the fluid circulating through the tube or by controlling the rate of flow of the fluid through the tube or by both factors.

Accurate control of the transfer or dissipation of heat withdrawn or transferred from the central longitudinal region of the tip section and the glass adjacent this section is essential in order that just sufficient heat is withdrawn whereby substantially uniform temperature is maintained across the entire bottom plate or tip section of the bushing, eliminating concentration or excess of heat in the zone contacted by the refractory thermal spacer 78. The refractory insert or spacer 78 electrically insulates the metal tube 80 from contact with the metal of the tip section.

Through the provision of the raised portion 76 at the lengthwise central region of the stream feeder, the raised ridge provides an additional degree of rigidity by reason of its inverted channel-like shape. The raised ridge portion 76 functions as an expansion region to accommodate or compensate for transverse expansion of the tip section and prevent widthwise buckling of the tip section.

When the stream feeder or bushing is highly heated by the electric current and the molten glass, the refractory tends to retract or shrink slightly from the internal surfaces of the raised ridge portion 76 facilitating expansion at the central region of the stream feeder.

While a solid metal member contacting the refractory spacer 78 may be employed without circulating fluid cooling, such member would necessarily have to be of a size to provide a large heat dissipating surface and would extend a substantial distance beneath the stream feeder presenting an obstruction to the operator's view of the entire tip section. The amount of refractory 78 between the stream feeder and the supporting tube is such that the dissipation or removal of the heat at the lengthwise central region of the feeder is equal to or the same as that of the other areas.

The cooling action of the support means or heat sink must not influence the regions of the metal tip section or the glass at any appreciable distance either side of the central region as an unstable viscosity condition in the glass may occur at the longitudinal rows of tips 66 adjacent either side of the ridge 76. A transversely extending bar or member 91, shown in FIGURE 3, secured to the bushing supporting frame 42 may be disposed beneath and in supporting contact with the tube 80 providing reinforcement for the tube midway of its length.

While it is highly desirable to flow the glass through the orificed tips at a comparatively low viscosity in a highly liquidus state in order to promote the formation of streams of glass of uniform size and characteristics, it is essential to increase the viscosity of the glass of the streams adjacent the exterior of the tips in order to satisfactorily attenuate fine filaments from the streams. Means is provided for conveying heat away from the glass of the streams to raise the viscosity. As particularly shown in FIGURES 1 and 5, tubular members or manifolds 94 are disposed at opposite sides of the streams and extend lengthwise of the feeder or bushing.

Extending laterally from the manifolds 94 are vanes or fins 96, each fin extending between adjacent transversely arranged rows of tips as shown in FIGURES 2 and 3, the fins being fused, welded or otherwise secured to the manifolds in heat conducting relation therewith. The manifolds 94 are arranged to accommodate a circulating cooling fluid, for example, water. The fins 96 absorb or withdraw heat from the streams and the heat conducted by the fins to the manifolds 94 is carried away by the circulating fluid. Through this arrangement, the withdrawal or extraction of heat from the streams of glass increases the viscosity of the glass to promote efficient attenuation of the streams to fine filaments. Members 95 of refractory may be disposed between the manifolds 94 and the edge regions of the feeder floor as shown in FIGURE 7.

The rate of flow of coolant or heat dissipating fluid through the manifolds 94 is regulated in a conventional manner to thereby control the viscosity of the glass of the streams. In the embodiment illustrated, a fin 96 is disposed between adjacent transverse rows of tips or projections 66, but it is to be understood that a fin may be disposed between every second transverse row or projections whereby each fin absorbs heat from two transverse rows of glass streams. The amount of heat continuously removed or conveyed away by the cooling means through the refractory spacer or member 78 is such that the region of the floor or tip section contacting the refractory does not exceed the temperature of the remainder of the floor or tip section.

Another factor providing additional strength against sagging of the tip section is the composition or alloy of which the tip section may be fabricated. It is found that a platinum and rhodium alloy having a comparatively high percentage of rhodium is endowed with higher strength characteristics under high temperatures than a similar alloy having a comparatively low percentage of rhodium. A platinum and rhodium alloy for a tip section having approximately twenty-five percent rhodium has been found to have satisfactory high strength characteristics.

The side and end walls and the flange 50 are preferably fabricated of a platinum and rhodium alloy having a lesser amount of rhodium therein as high strength characteristics are usually not required for these portions of the feeder or bushing. The tip section may be welded to the side and end walls by conventional methods.

Figure 6:
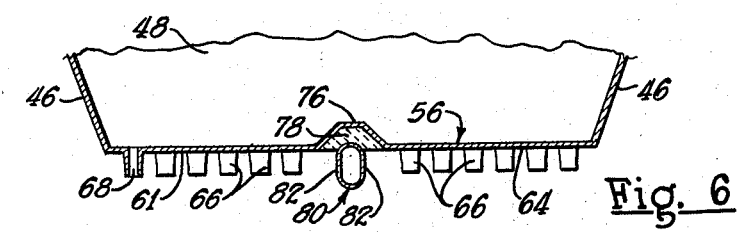
FIGURE 6 is a fragmentary sectional view of a portion of the construction shown in FIGURE 5.
Figure 8:
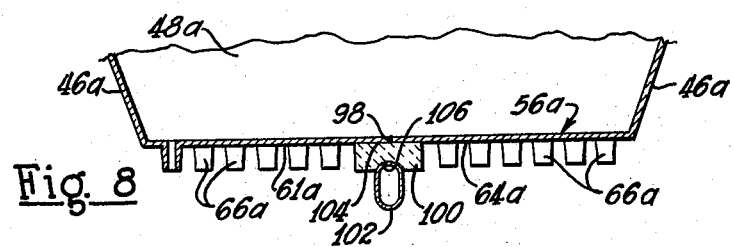
FIGURE 8 is a view similar to FIGURE 6 illustrating a modified form of support and heat conducting means for the stream feeder.

FIGURE 8 is a view similar to FIGURE 6 illustrating a modified arrangement of refractory spacer and support means for the tip section. The feeder construction illustrated in FIGURE 8 is similar to FIGURE 6 having a floor 56a, side walls 46a and end walls 48a, the side and end walls being welded or integrally joined with the floor or tip section 56a. The section 56a comprises subsections 61a and 64a welded together as at 98. Each subsection is provided with a plurality of depending orificed projections 66a arranged in lengthwise and transverse rows as hereinbefore described in connection with the construction shown in FIGURES 3 through 7.

In this form of construction, a refractory member or spacer 100 and a tubular support means 102 are disposed beneath the longitudinal central region of the floor or tip section 56a. The refractory member or spacing means 100 engages the planar central region 104 of the floor of the feeder, the upper surface of the refractory 100 being contiguous with the plane of the exterior surface of the feeder floor. The support means 102 is of tubular construction, the cross sectional configuration being elongated in a vertical direction as the tube 80 illustrated in FIGURE 6. The upper surface region of the tube 102 preferably extends into or nests in a shallow recess 106 provided in the refractory member 100.

The support means 102 accommodates a circulating cooling fluid, such as water, for conveying away heat from the central region of the floor of the tip section 56a in order to maintain a substantially uniform temperature throughout the area of the tip section. The circulation of cooling fluid through the support tube 102 is controlled by conventional means to convey away heat at the desired rate.

Figure 9:
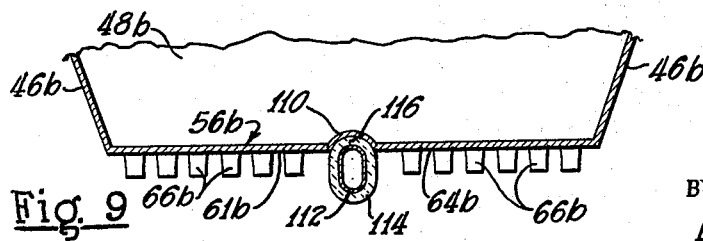
FIGURE 9 is a view similar to FIGURE 6 illustrating a further modification of support means for the stream feeder.

FIGURE 9 is a sectional view similar to FIGURE 8 illustrating another modification of support arrangement for the tip section. In this form the tip subsections or components 61b and 64b comprising the floor 56b of the stream feeder are joined with side walls 46b and end walls 48b to form the feeder. Each of the subsections is provided with a plurality of orificed tips or projections 66b. Provided at the central longitudinal region of the floor of the tip section 56b and joining the subsections is a raised portion 110 preferably of curved configuration in cross section as illustrated in FIGURE 9.

Disposed beneath the raised portion 110 is a support tube 112 of hollow configuration of a cross section elongated in a vertical direction to provide strength characteristics to resist sagging of the floor or tip section 56b. The tube 112 is embedded in or surrounded by a refractory member or casing 114, the portion 116 of the refractory casing being disposed between the upper portion of the tube 112 and the lower surface of the curved ridge 110, as illustrated in FIGURE 9.

Heat absorbing or cooling fluid is circulated through the metal tube 112 to convey away heat adjacent the ridge 110 of the tip section to maintain uniform temperature throughout the entire area of the tip section 56b.

The insulation characteristics of the refractory casing surrounding the metal tubular support 12 minimizes the influence of the cooling fluid on the rows of tips 66b adjacent each side of the refractory. The rate of flow of cooling fluid and its temperature are controlled by conventional means to withdraw only the amount of heat from the central region of the tip section to provide substantially uniform temperature throughout the area of the tip section 56b.

Figure 11:
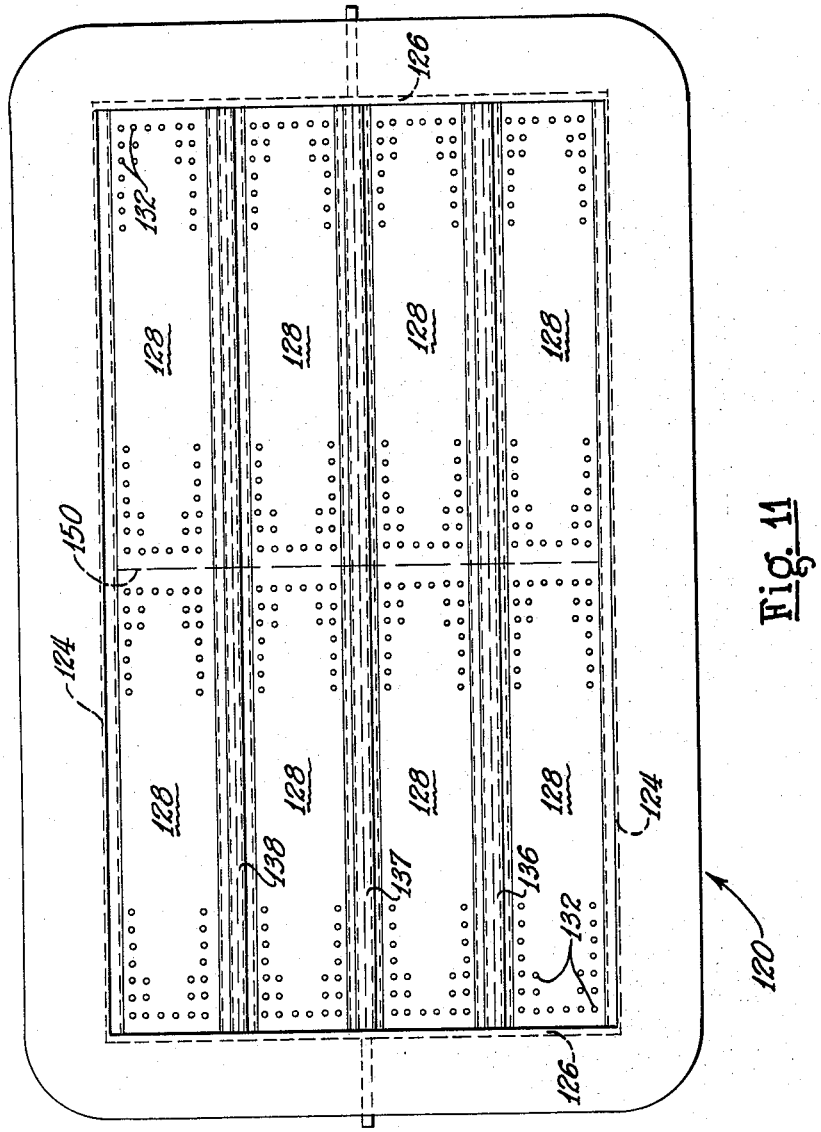
FIGURE 11 is a top plan view of the construction illustrated in FIGURE 10.

FIGURES 10 and 11 illustrate a stream feeder or bushing having a comparatively large tip section 122 comprising eight subsections welded or integrated into a unit. The stream feeder 120 includes side walls 124 and end walls 126, which are welded to the side edges and end edges of the adjacent subsections 128. As particularly shown in FIGURE 11, the floor or tip section 122 comprising eight subsections 128, each of said subsections being provided with a comparatively large number of tips 130, the tips having orifices 132 through which streams of heat-softened glass flow from the feeder.

While the tip section or floor area 122 of the feeder shown in FIGURES 10 and 11 is inclusive of eight subsections 128, it is to be understood that the floor or tip section may comprise a different number of subsections.

Disposed lengthwise of the subsections and between adjacent subsections are raised portions 136, 137 and 138, the adjacent subsections being welded to the raised portions, as hereinbefore described in connection with the construction illustrated in FIGURES 3 through 7.

Disposed in each lengthwise recess formed by the raised portions is a refractory spacer or member 140, as particularly shown in FIGURE 10, the spacers 140 being of the same character as illustrated at 78 in FIGURE 6. Disposed beneath the spacers 140 and the raised portions 136, 137 and 138 are tubular support means or tubes designated respectively 142, 143 and 144. The tubular supports are elongated in a vertical direction in the same manner as the tube 80 in FIGURE 6 to obtain the strength characteristics provided by the vertical parallel walls of the tubular members.

Each of the tubes 142, 143 and 144 is adapted to accommodate circulating cooling fluid, such as water, to convey heat away from the regions of the raised portions 136, 137 and 138 to promote a uniform and stabilized temperature at a horizontal region adjacent and throughout the entire area of the tip section 122. The temperature and rate of flow of fluid through the support tubes is controlled in a conventional manner to convey away the excess heat at the regions of the raised portions 136, 137 and 138.

In the arrangement shown in FIGURES 10 and 11, each of the tubular support members 142 and 144 is provided with transversely extending fins or vanes 148 which are disposed between adjacent transverse rows of tips or projections 130 in the same manner as the hereinbefore described construction shown in FIGURES 2, 3 and 5. The fins 148 withdraw heat from the streams of glass delivered from the orificed tips 130 rendering the glass of the streams of increased viscosity to facilitate attenuation of the glass to filaments.

In an arrangement of the character shown in FIGURES 10 and 11, the cooling media flowing through the tubular supports 142 and 144 performs a dual function in that it conveys away the excess heat developed at the regions of the raised portions 136 and 138 of the feeder floor and the heat withdrawn or absorbed from the glass streams through the fins or vanes 148. Thus, the rate of flow of cooling media through the tubes 142 and 144 is increased or the inlet temperature of the cooling fluid reduced or both in order to transfer the proper amount of heat away from the vanes and the raised portions 136 and 138 to promote stabilized temperature and hence viscosity of the glass immediately adjacent the tip section 122.

The tube 143 supporting the central region at the raised portion 137 accommodates cooling fluid moving therethrough at a slower rate or of an increased temperature or both in order to maintain the temperature of the raised portion 137 and the softened glass adjacent thereto of the same temperature as that of the other regions of the tip section 122. The adjacent end regions of subsections 128 disposed lengthwise of the feeder are welded together at the region identified by the line 150 in FIGURE 11.

Each of the subsections 128 may be prefabricated and the several preformed subsections welded together to form an integrated unit as shown in FIGURES 10 and 11. The support means 142, 143 and 144 being transversely spaced and extending lengthwise of the feeder resist the tendency of the tip section to sag under the intense heat of the glass and, through the heat dissipating media flowing through the support tubes, the temperature and hence viscosity of the glass horizontally and adjacent the entire tip section area is maintained substantially uniform whereby the streams flowing through the many orificed tips are of uniform size and have substantially identical characteristics.

By promoting uniformity of temperature and characteristics of the streams delivered from all of the tips, the fine continuous filaments attenuated therefrom are of substantially uniform size and endowed with substantially the same strength characteristics.

It is to be understood that, if desired, transversely disposed support means may be employed similar to the bar 91 shown in FIGURE 3 engaging the lower surfaces of the tubes 142, 143 and 144 to provide added strength supplementing the tubes to prevent or resist sagging of the floor or tip section.

It is apparent that, within the scope of the invention, modifications and different arrangements may be made other than as herein disclosed, and the present disclosure is illustrative merely, the invention comprehending all variations thereof.

I claim:

1. Apparatus for feeding streams of heat-softened mineral material comprising, in combination, a stream feeder having a floor provided with groups of orifices, a refractory body disposed beneath and engaging the feeder floor at a region between groups of orifices, and an elongated member engaging the refractory body and supporting said feeder arranged to conduct heat from a region of the feeder floor between groups of orifices.

2. Apparatus for feeding streams of heat-softened mineral material comprising, in combination, a stream feeder having a floor area provided with groups of orifices, support means for the stream feeder including an elongated member disposed beneath and adjacent a region of the floor area between groups of orifices, a body of insulating material disposed between said elongated member and the adjacent region of the feeder floor area, said elongated member being arranged to conduct heat from the region of the floor area between groups of orifices whereby streams of substantially uniform viscosity flow from all regions of the floor area.

3. The combination according to claim 2 wherein the floor area comprises a plurality of preformed sections, each of said sections provided with one group of orifices.

4. Apparatus for feeding streams of heat-softened mineral material comprising, in combination, a stream feeder having a floor area provided with spaced groups of orifices, support means for the stream feeder including an elongated member disposed beneath and adjacent the region of the floor between spaced groups of orifices, and refractory means disposed between the floor of the stream feeder and the elongated member, said elongated member being arranged to conduct heat from the refractory means and the region of the floor area between groups of orifices to promote thermal uniformity in all regions of the floor area.

5. Apparatus for feeding streams of heat-softened mineral material comprising, in combination, a stream feeder having a floor comprising a plurality of sections joined together, each of said sections having a group of orifices formed therein, a body of heat resistant insulating material engaging the feeder floor at a region between groups of orifices, and a support means for the feeder floor engaging said body, said support means arranged to conduct heat from the feeder floor at a region between groups of orifices.

6. Apparatus for feeding streams of heat-softened mineral material comprising, in combination, a stream feeder having a floor area provided with spaced groups of orifices, support means for the stream feeder including a tubular member disposed beneath and adjacent the region of the floor area between spaced groups of orifices, a body of insulating material between said tubular member and the feeder floor, said tubular member being arranged to accommodate a moving heat-transfer medium to convey away heat from the region of the floor area between groups of orifices to promote thermal uniformity in all regions of the floor area.

7. Apparatus for feeding streams of heat-softened mineral material adapted to be attenuated to fibers comprising, in combination, a stream feeding means including a receptacle of an alloy of platinum having a floor and side and end walls, said floor comprising a plurality of sections joined together, each of said sections having a group of depending projections, each projection having an orifice, a refractory body beneath and engaging the floor at a region between groups of projections, and tubular support means for the feeder floor engaging the refractory body, said tubular means being arranged to accommodate a moving heat transfer medium to conduct heat away from the floor in the region between groups of orifices to promote thermal uniformity of the streams flowing through the orifices.

8. Apparatus for feeding streams of heat-softened mineral material adapted to be attenuated to filaments comprising, in combination, a stream feeder having a floor area provided with spaced groups of orifices, support means for the stream feeder including a tubular metal member disposed beneath and adjacent the region of the floor area between spaced groups of orifices, a refractory body disposed between the floor of the stream feeder and the tubular member, said tubular member being arranged to accommodate a moving heat-transfer medium to convey away heat from the region of the floor area between groups of orifices to promote thermal uniformity in all regions of the floor area.

9. Apparatus for feeding streams of heat-softened mineral material comprising, in combination, a stream feeder having a floor provided with groups of orifices, a body of heat-resistant noncurrent conducting material disposed beneath and engaging the feeder floor at a region beneath groups of orifices, and metal support means supporting the feeder floor engaging said body arranged to conduct heat from a region of the feeder floor between groups of orifices.

10. The combination according to claim 9 wherein the floor area comprises a plurality of preformed rectangularly-shaped sections, each of said sections provided with one group of orifices.

11. Apparatus for feeding streams of heat-softened mineral material comprising, in combination, a stream feeder of generally rectangular shape having a floor provided with groups of orifices, a refractory body extending lengthwise of the feeder disposed beneath and engaging the feeder floor at a region between groups of orifices, support means for the feeder floor including a member extending lengthwise of the feeder and engaging the refractory body arranged to conduct heat from a region of the feeder floor between groups of orifices, and transversely disposed reinforcing means for said member.

References Cited

UNITED STATES PATENTS

| | | | |
|---|---|---|---|
| 2,794,058 | 5/1957 | Russell | 65—1 X |
| 3,002,226 | 10/1961 | Warthen | 65—1 X |
| 3,150,946 | 9/1964 | Russell | 65—12 X |
| 3,256,078 | 5/1966 | Drummond | 65—12 X |

DONALL H. SYLVESTER, *Primary Examiner.*

R. L. LINDSAY, *Assistant Examiner.*